US005761031A

United States Patent [19]

Ajmani

[11] Patent Number: 5,761,031
[45] Date of Patent: Jun. 2, 1998

[54] CONDUCTIVE SHOCK MOUNT FOR REDUCING ELECTROMAGNETIC INTERFERENCE IN A DISK DRIVE SYSTEM

[75] Inventor: Ravinder Singh Ajmani, Fremont, Calif.

[73] Assignee: International Business Machines Corporation, Armonk, N.Y.

[21] Appl. No.: 749,473

[22] Filed: Nov. 15, 1996

[51] Int. Cl.$^6$ .................. G06F 1/16; H05K 9/00; G11B 33/08
[52] U.S. Cl. .................. 361/685; 361/753; 361/818; 439/66
[58] Field of Search ............... 439/66, 91; 174/35 GC, 174/151, 153 G; 361/685, 753, 818

[56] References Cited

U.S. PATENT DOCUMENTS

| | | | |
|---|---|---|---|
| 4,639,863 | 1/1987 | Harrision et al. | 361/685 X |
| 4,831,211 | 5/1989 | McPherson et al. | 174/35 R |
| 5,008,485 | 4/1991 | Kitagawa | 174/35 GC |
| 5,067,041 | 11/1991 | Cooke et al. | 361/394 |
| 5,107,404 | 4/1992 | Tam | 361/818 |
| 5,262,923 | 11/1993 | Batta et al. | 361/685 |
| 5,366,200 | 11/1994 | Scura | 248/632 |
| 5,402,308 | 3/1995 | Koyanagi et al. | 361/685 |
| 5,414,574 | 5/1995 | Boutaghou et al. | 360/97.01 |
| 5,491,608 | 2/1996 | Koyanagi et al. | 361/685 |
| 5,491,892 | 2/1996 | Fritz et al. | 29/857 |

FOREIGN PATENT DOCUMENTS 01 144699  6/1989  Japan .................. H05K 7/14

*Primary Examiner*—Michael W. Phillips
*Attorney, Agent, or Firm*—John H. Holcombe; Ingrid M. Foerster

[57] ABSTRACT

A disk drive system for both providing shock protection to the disk drive and reducing electromagnetic interference. A printed circuit board is provided having a shock sensitive device such as a disk drive and having electronic circuit components, e.g., data handling components capable of operating at a high data rate mounted thereon. The printed circuit board is provided with an electrical ground path and with at least one shock mount point. The shock mount point is provided with a conductive pad which is electrically connected to the electrical ground path of the printed circuit board. An electrically conductive carrier is provided for supporting the printed circuit board. At least one shock mount system is provided for attaching the printed circuit board to the carrier. The shock mount system comprises a shock mount grommet coated with an electrically conductive coating for electrically connecting the conductive pad to the carrier. The electrically conductive coating may be a uniform coating of copper paint to preserve the shock absorbing characteristics of the shock mount. The shock mount system may additionally comprise a compression fixture for compressing the shock mount grommet into contact with the printed circuit board conductive pad and into contact with the carrier.

34 Claims, 3 Drawing Sheets

CONDUCTIVE SHOCK MOUNT FOR REDUCING ELECTROMAGNETIC INTERFERENCE IN A DISK DRIVE SYSTEM

TECHNICAL FIELD

This invention relates generally to disk drive systems and more particularly to the circuit board, carrier and shock mount system for supporting the disk drive.

BACKGROUND OF THE INVENTION

Disk drives such as magnetic disk drives store information on circular tracks of a rotatable magnetic recording media. In conventional magnetic disk drives, a transducer head positioned on a slider is moved laterally from track to track by an actuator to read or record the desired information. Typically, the slider "flies" slightly above the surface of the disk as the disk rotates. A major problem faced by such drives is the prospect of a shock to the drive resulting in the slider impacting the surface of the rotating disk, called a "head crash". In addition, in order to attain high data capacities, the track spacing of disk drives is constantly being reduced to provide track densities of 1,000 track per inch and upwards. Shock not sufficient to cause a "head crash" can cause the head to be moved from the centerline of a track sufficiently to cause errors in the reading or writing of data. Therefore, it is extremely important to provide shock protection to the drive.

An example of a shock mount assembly for a disk drive is shown in U.S. Pat. 5,366,200, Scura, issued Nov. 22, 1994.

Conventional construction of many current disk drive systems utilizes a printed circuit board to support the electronic components necessary for control and operation of the disk drive and the related conventional function of recording data on magnetic media, as well as a rigid metal base plate for stability and for precision positioning of the spindle supporting the disk(s) with respect to the head actuator.

An example of a printed circuit board and base plate for supporting a disk drive is shown in U.S. Pat. 5,414,574, Boutaghou et al., issued May. 9, 1995.

Conventionally, the printed circuit board is grounded in order to reduce the electromagnetic interference produced by the data signals along the leads of the board. Typically, the printed circuit board is grounded by a solid, conductive screw mounting at the end of the printed circuit board where the electrical cable connections to the drive are made. The printed circuit board has some flexibility so that shock mounting at the other end of the board holding the base plate and disk drive is not affected by the solid mounting.

Now, in addition to storing large amounts of data, the rate at which the data is read or written to the disk drive is advancing rapidly, reaching 20 megabytes per second or more. As the result, the leads on the printed circuit board are of such length as compared to the length of the data signals that they may act as antennas. Thus, grounding the printed circuit board only at an end is not sufficient.

Cost is also of major concern in the disk drive industry, and the addition of parts to a drive both increases the parts cost and adds to the complexity of the assembly process, resulting in increased cost of the drive. Thus, adding a grounding strap to the shock mount, as described in U.S. Pat. 5,491,892, Fritz et al., is not desirable.

Making a shock mount grommet of a conductive rubber was considered, but was found to be prohibitively expensive. An example of a conductive rubber for holding a printed circuit board is described in a Japanese published patent application, publication number 01-144699, Sukeyuki, published Jun. 6, 1989.

SUMMARY OF THE INVENTION

In order to both provide shock protection to a disk drive and reduce electromagnetic interference, while not adding to the parts count of the drive assembly, a conductive shock mount system and printed circuit board arrangement are described. A printed circuit board is provided having a shock sensitive device such as a disk drive and having electronic circuit components, e.g., data handling components mounted thereon. The printed circuit board is provided with an electrical ground path and with at least one shock mount point. The shock mount point is provided with a conductive pad which is electrically connected to the electrical ground path of the printed circuit board. An electrically conductive carrier is provided for supporting the printed circuit board. At least one shock mount system is provided for attaching the printed circuit board to the carrier. The shock mount system comprises a shock mount grommet coated with an electrically conductive coating for electrically connecting the conductive pad to the carrier. The electrically conductive coating may be a uniform coating of copper paint. The shock mount system may additionally comprise a compression fixture for compressing the shock mount grommet into contact with the printed circuit board conductive pad and into contact with the carrier.

The foregoing, together with other objects, features and advantages of this invention, will become more apparent when referring to the following specification, claims and the accompanying drawings.

DETAILED DESCRIPTION OF THE PREFERRED EMBODIMENTS

This invention is described in a preferred embodiment in the following description with reference to the Figures, in which like numbers represent the same or similar elements. While this invention is described in terms of the best mode for achieving the advantages of the invention, it will be appreciated by those skilled in the art that variations may be accomplished in view of these teachings without deviating from the spirit or scope of the invention.

Figure 1:
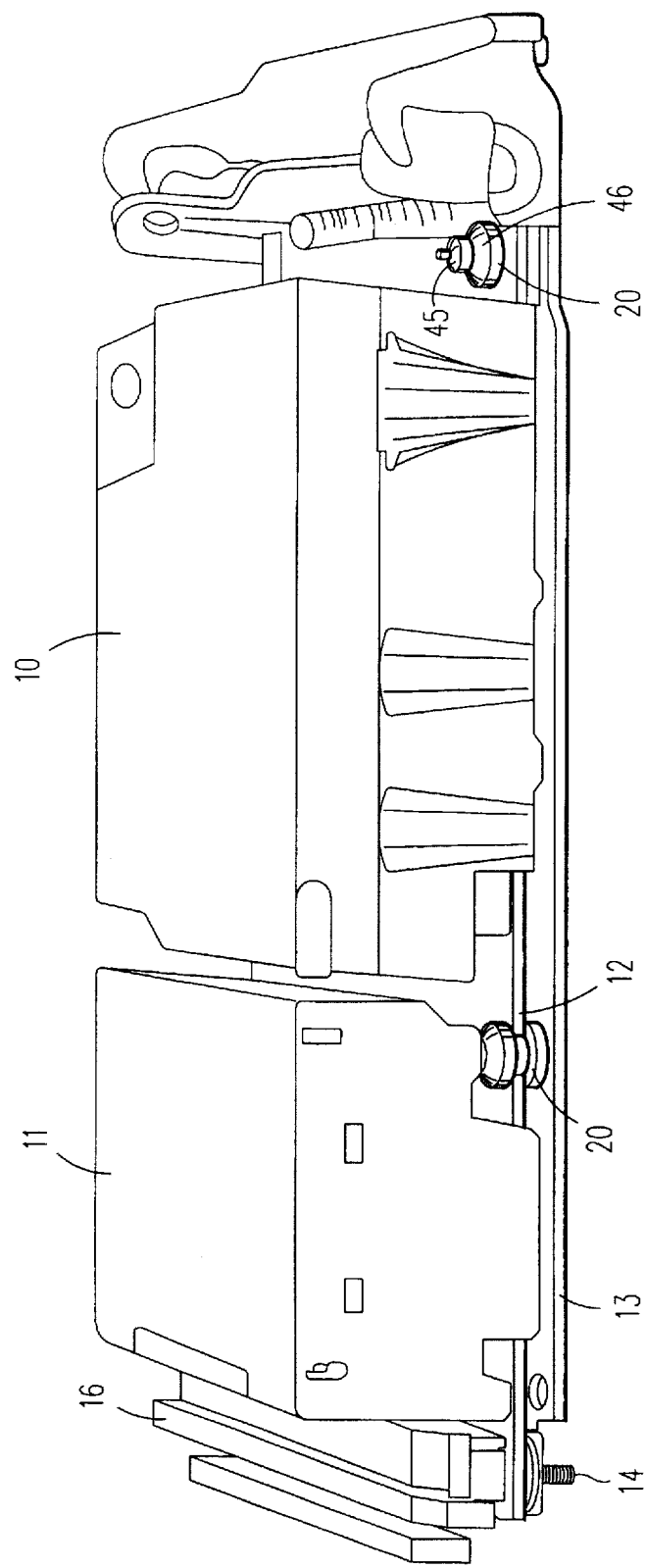
FIG. 1 is an illustration of a printed circuit board with disk drive, a carrier, and shock mount assemblies of the invention.

With reference to FIG. 1, a disk drive 10 and power supply 11 are shown mounted on a printed circuit board 12. The disk drive may be of any suitable type, such as optical or magnetic, and the disks may be fixed or removable. The present invention is most advantageously used with a fixed "or hard" disk drive which operates at a high data rate. Magnetic disk drives store information on circular tracks of a rotatable magnetic recording media. A transducer head positioned on a slider is moved laterally from track to track by an actuator to read or record the desired information. Typically, the slider "flies" slightly above the surface of the disk as the disk rotates. The disk drive has a rigid metal base plate for stability and for precision positioning of the spindle supporting the disk(s) with respect to the head actuator.

Also mounted on the printed circuit board 12 are electronic components necessary for control and operation of the mounted device, e.g. for the related function of recording data on magnetic media of a disk drive. The specific components are not shown, and are readily available, as understood by those skilled in the art. Conventionally, the printed circuit board is grounded at one end in order to reduce the electromagnetic interference produced by the data signals along the leads of the board. The conventional grounding of printed circuit board 12 to carrier 13 is by two solid, conductive screw mountings 14 (only one is shown) at the end of the printed circuit board where the electrical cable connections to the drive are made as shown by connector 16. As is known by those skilled in the art, the printed circuit board 12 has some flexibility so that shock mounting at the other end of the board holding the disk drive is not affected by the solid mounting. Carrier 13 comprises any rigid support member (or members) capable of serving as an electrical ground or ground connection. The example shown is a metal rack.

Present data storage devices such as disk files and the associated circuitry are rapidly increasing the frequency of the data and therefore the data rate. In so doing, data transmitted within the printed circuit board is achieving 20 megabytes per second data rate and higher. At such data rates, the circuit leads of the printed circuit board tend to act as antennas to produce unwanted electromagnetic interference without grounding or attenuation at shorter lengths.

Figure 2:
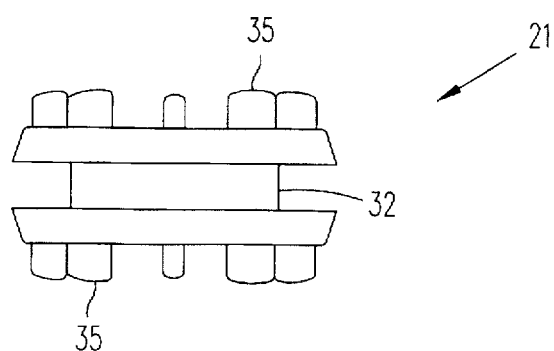
FIG. 2 is a side view of a shock mount grommet.
Figure 3:
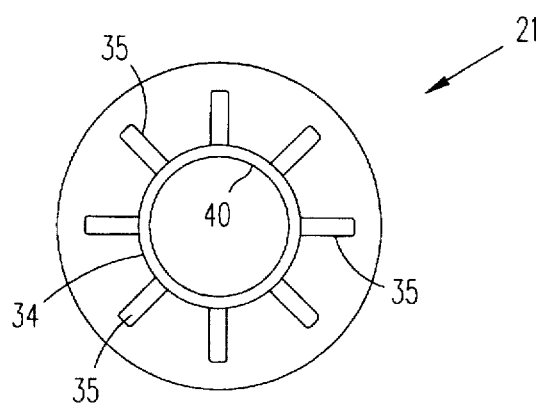
FIG. 3 is a top view of the shock mount grommet of FIG. 2, showing a sleeve in the center hole of the grommet.
Figure 5:
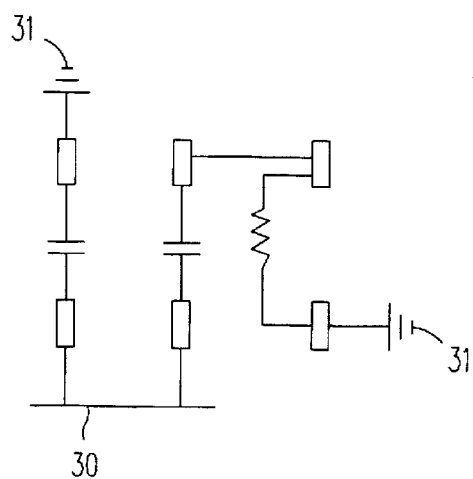
FIG. 5 is a diagram of an electrical connection between the conductive pads and ground path of the printed circuit board of FIG. 4.
Figure 4:
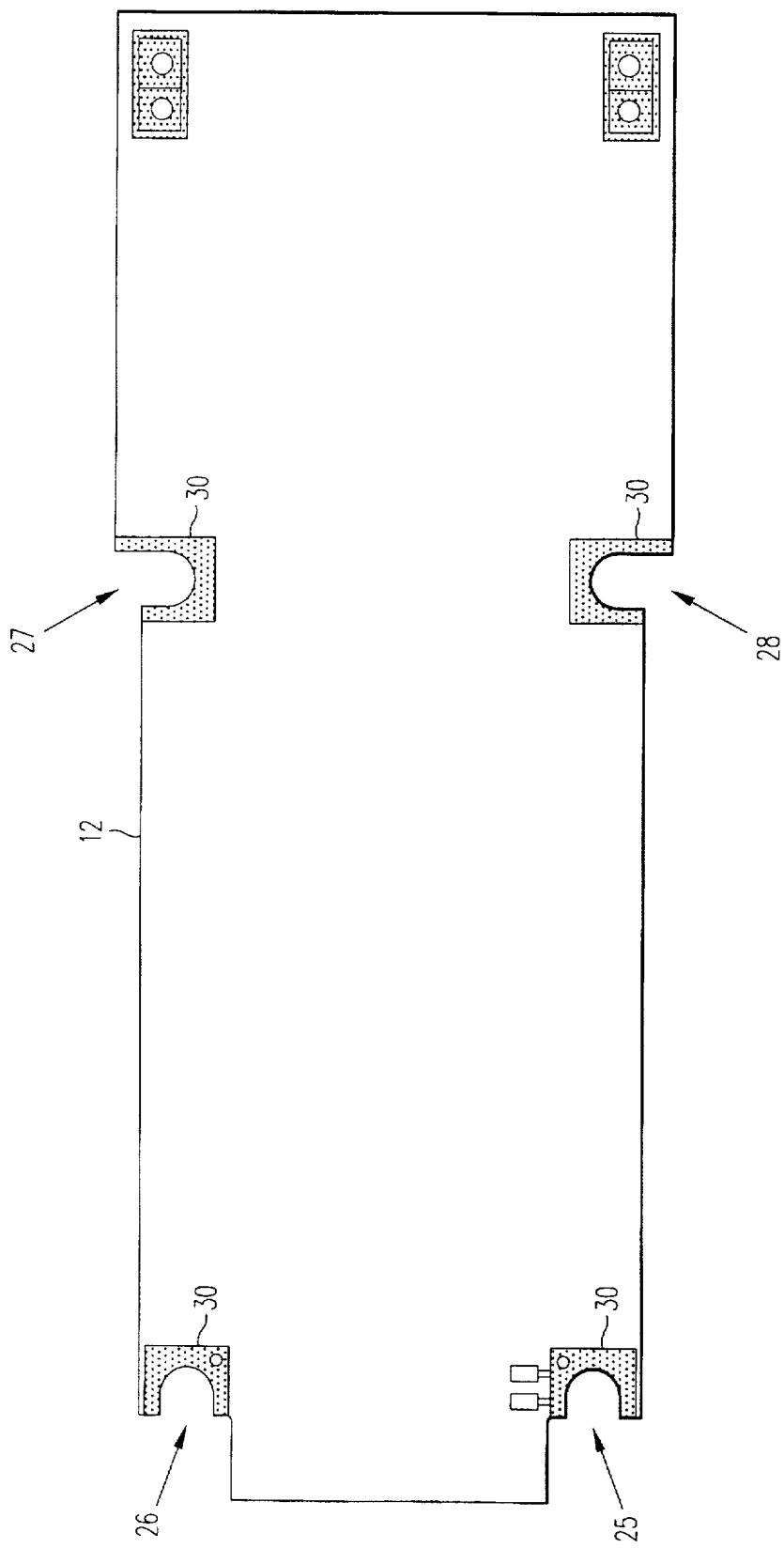
FIG. 4 is an illustration of the printed circuit board of FIG. 1 showing a plurality of conductive pads.

Shock mount 20, comprising grommet 21 shown in more detail in FIGS. 2 and 3, both provides shock protection to the disk drive and reduces electromagnetic interference. As shown in FIG. 4, printed circuit board 12 is provided with shock mount points 25 through 28. Each shock mount point is provided with a conductive pad 30 which is electrically connected to the electrical ground path of the printed circuit board. As understood by those skilled in the art, the specific connections can be either a direct connection, or an indirect connection through circuitry which provides electrostatic discharge protection. Such electrostatic discharge (ESD) protection is preferable. In FIG. 5, one of many examples of suitable ESD protective circuits is shown connected between a conductive pad 30 and the ground path 31 of the printed circuit board. In addition, each of the conductive pads 30 of FIG. 4 may additionally be provided with vias at various positions, preferably at each of the corners, so as to provide a good electrical connection to the pad 30 on the opposite side of the printed circuit board.

Referring to FIGS. 2 and 3, the shock mount grommet 21 is shaped to provide generally circular groove 32. The groove will allow insertion of the printed circuit board 12. A center hole 34 in the shock mount grommet allows insertion therethrough of a cap screw or similar compression fixture. Tabs 35 on the top and bottom of the shock mount grommet are optional and allow considerable shock absorption to occur when the cap screw and nut are tightened to compress the shock mount grommet. One of ordinary skill in the art will recognize that many similar types of shock mount grommets may be employed.

The shock mount grommet is coated with a conductive material, preferably including the interior of center hole 34. A uniform coating is preferred so as to preserve the shock absorbing characteristics of the shock mount. Should the coating not be uniform, the shock mount may distort and not provide the correct shock absorption. In addition, a uniform coating provides the best ability to provide the electrical conductive path between groove 32 to tabs 35, as will be shown. A vertically patterned coating may provide non-distorting shock absorption, but will provide less conductivity and will be more costly.

Any conductive material will be suitable; however, a metallic paint is the most effective. Examples include gold, silver, nickel, copper, and mixed metals. From the standpoints of cost, conductivity and flexibility, copper is the most effective. Spraying is the cost effective method of applying paint uniformly to the shock mount grommet. An example of a commercially available flexible copper conductive coating which is sprayable is Series 599-Y1325 from Spraylat Corp., Mount Vernon, N.Y.

The most suitable coating thickness is approximately 1 mil. The coating thus retains the flexibility of the shock mount grommet and provides the needed conductivity.

As shown in FIG. 2, the groove 32 is slightly smaller than the width of the printed circuit board 12 at the shock mount points. A natural tight fit will aid in assuring good electrical contact between the conductive coating of the shock mount grommet and the printed circuit board conductive pads 30.

In the preferred embodiment, a compression fixture, such as a conductive cap screw 45, as shown in FIG. 1, inserted through the center hole of the shock mount grommet 21, and a nut 46, are tightened with the shock mount grommet in position. The cap screw is made of a conductive metal, such as brass. Tightening the cap screw will compress the shock mount grommet, making the electrical contact between the conductive coating in the groove 32 and the printed circuit board conductive pads 30 and between one set of pads 35 and the carrier 13 much more effective.

As shown in FIG. 3, a conductive sleeve 40 may be inserted in the coated center hole 34 of the shock mount grommet 21. Tightening also compresses the grommet so that the contact between the sleeve 40 and the conductive coating in the center hole 34 is more effective.

Lastly, tightening also makes the contact between the cap screw or nut and the conductive coating at the other set of pads 35 of the shock mount grommet more effective.

When assembled and tightened, the conductive shock mount assembly provides a resistance less than 5 ohms, generally 2 ohms. Measurements taken show that the electromagnetic interference of the printed circuit board is reduced by 5–15 db in the frequency range of 160 to 240 megahertz, which are resonant frequencies of 20 megabytes per second data rate.

Other embodiments and modifications of this invention may occur to those of ordinary skill in the art in view of these teachings. Therefore, this invention is to be limited only by the following claims, which include all such embodiments and modifications when viewed in conjunction with the above specification and accompanying drawings.

We claim:

1. Disk drive assembly comprising:

a printed circuit board having a disk drive mounted thereon, and having at least one shock mount point, said shock mount point having a conductive pad electrically connected to an electrical path of said printed circuit board;

a carrier for supporting said printed circuit board, said carrier being electrically conductive; and at least one shock mount system for attaching said printed circuit board to said carrier, each said shock mount system comprising a shock mount grommet coated with an electrically conductive coating for electrically connecting said conductive pad to said carrier.

2. The disk drive assembly of claim 1, wherein said electrically conductive coating is a metallic paint.

3. The disk drive assembly of claim 2, wherein said metallic paint comprises copper paint.

4. The disk drive assembly of claim 1, wherein said electrically conductive coating is of uniform thickness.

5. The disk drive assembly of claim 4, wherein said uniform thickness is substantially 1 mil.

6. The disk drive assembly of claim 1, wherein said shock mount grommet has a slotted periphery for supporting said printed circuit board at said shock mount point.

7. The disk drive assembly of claim 6, wherein said shock mount grommet slotted periphery width is less than the thickness of said printed circuit board at said shock mount point.

8. Disk drive assembly comprising:

a printed circuit board having a disk drive mounted thereon, and having at least one shock mount point, said shock mount point having a conductive pad electrically connected to an electrical path of said printed circuit board;

a carrier for supporting said printed circuit board, said carrier being electrically conductive; and at least one shock mount system for attaching said printed circuit board to said carrier, said shock mount system comprising a shock mount grommet coated with an electrically conductive coating for electrically connecting said conductive pad to said carrier, said shock mount system additionally comprising a compression fixture for compressing said shock mount grommet into contact with said printed circuit board conductive pad and into contact with said carrier.

9. The disk drive assembly of claim 8, wherein said electrically conductive coating is a metallic paint.

10. The disk drive assembly of claim 9, wherein said metallic paint comprises copper paint.

11. The disk drive assembly of claim 8, wherein said electrically conductive coating is of uniform thickness.

12. The disk drive assembly of claim 11, wherein said uniform thickness is substantially 1 mil.

13. The disk drive assembly of claim 8, wherein said shock mount grommet additionally has a center hole through which said compression fixture extends.

14. The disk drive assembly of claim 13, wherein said compression fixture is electrically conductive and additionally is in electrical contact with said carrier, and wherein said shock mount grommet is compressed by said compression fixture to bring said electrically conductive coating in said center hole into electrical contact with said compression fixture at said center hole.

15. The disk drive assembly of claim 14, wherein said electrically conductive coating is a metallic paint.

16. The disk drive assembly of claim 15, wherein said metallic paint comprises copper paint.

17. The disk drive assembly of claim 14, wherein said electrically conductive coating is of uniform thickness.

18. The disk drive assembly of claim 17, wherein said uniform thickness is substantially 1 mil.

19. The disk drive assembly of claim 13, wherein said shock mount assembly additionally comprises an electrically conductive sleeve through which said compression fixture extends and said sleeve and compression fixture extend through said center hole of said shock mount grommet, and wherein said shock mount grommet is compressed by said compression fixture to bring said electrically conductive coating in said center hole into electrical contact with said sleeve at said center hole.

20. The disk drive assembly of claim 19, wherein said electrically conductive coating is a metallic paint.

21. The disk drive assembly of claim 20, wherein said metallic paint comprises copper paint.

22. The disk drive assembly of claim 19, wherein said electrically conductive coating is of uniform thickness.

23. The disk drive assembly of claim 22, wherein said uniform thickness is substantially 1 mil.

24. Disk drive assembly comprising:

a printed circuit board having a disk drive and electronic circuit data handling components mounted thereon, said electronic circuit data handling components operating at a data rate of at least 20 megabytes per second, and said printed circuit board having an electrical ground path and having at least one shock mount point, said shock mount point having a conductive pad electrically connected to said electrical ground path;

a carrier for supporting said printed circuit board, said carrier being electrically conductive; and at least one shock mount system for attaching said printed circuit board to said carrier, each said shock mount system comprising a shock mount grommet coated with an electrically conductive coating for electrically connecting said conductive pad to said carrier.

25. The disk drive assembly of claim 24, wherein said printed circuit board has 4 shock mount points closely adjacent each of 4 corners of said disk drive; and said at least one shock mount system comprises four shock mount systems, each electrically connecting one of said shock mount points of said printed circuit board to said carrier.

26. The disk drive assembly of claim 25, wherein said electrically conductive coating is a metallic paint.

27. The disk drive assembly of claim 26, wherein said metallic paint comprises copper paint.

28. The disk drive assembly of claim 25, wherein said electrically conductive coating is of uniform thickness.

29. The disk drive assembly of claim 28, wherein said uniform thickness is approximately 1 mil.

30. An electronic assembly comprising:

a printed circuit board having a shock sensitive device and having electronic circuit data handling components mounted thereon, said electronic circuit data handling components operating at a data rate of at least 20 megabytes per second, and said printed circuit board having an electrical ground path and having at least one shock mount point, said shock mount point having a conductive pad electrically connected to said electrical ground path;

a carrier for supporting said printed circuit board, said carrier being electrically conductive; and at least one shock mount system for attaching said printed circuit board to said carrier, each said shock mount system comprising a shock mount grommet coated with an electrically conductive coating for electrically connecting said conductive pad to said carrier.

31. The electronic assembly of claim 30, wherein said electrically conductive coating is a metallic paint.

32. The electronic assembly of claim 31, wherein said metallic paint comprises copper paint.

33. The electronic assembly of claim 30, wherein said electrically conductive coating is of uniform thickness.

34. The electronic assembly of claim 33, wherein said uniform thickness is substantially 1 mil.

* * * * *